United States Patent
Gustavsson (10) Patent No.: US 7,256,347 B2
(45) Date of Patent: Aug. 14, 2007

(54) CORD CONTROL AND ACCESSORIES HAVING CORD CONTROL FOR USE WITH PORTABLE ELECTRONIC DEVICES

(75) Inventor: Stefan Bengt Gustavsson, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

(21) Appl. No.: 11/302,795

(22) Filed: Dec. 14, 2005

(65) Prior Publication Data

US 2007/0131445 A1 Jun. 14, 2007

(51) Int. Cl.
*H02G 15/02* (2006.01)

(52) U.S. Cl. .................. 174/74 R; 174/75 C; 340/548

(58) Field of Classification Search .................. 174/36, 174/69, 70 R, 72 A, 72 C, 73.1, 74 R, 79, 174/84 R, 88 R, 84 S; 340/665, 668; 455/575.2
See application file for complete search history.

(56) References Cited

U.S. PATENT DOCUMENTS

| | | | | |
|---|---|---|---|---|
| 33,285 | A * | 9/1861 | Kunen | 30/147 |
| 3,916,312 | A * | 10/1975 | Campbell | 455/90.2 |
| 4,088,971 | A | 5/1978 | Hermann et al. | |
| 4,321,479 | A * | 3/1982 | Ledniczki et al. | 307/116 |
| 4,668,876 | A * | 5/1987 | Skarman | 307/116 |
| 4,794,365 | A * | 12/1988 | Dunbar | 338/99 |
| 4,876,420 | A * | 10/1989 | Lodini | 200/86 R |
| 5,780,793 | A * | 7/1998 | Buchholz et al. | 200/61.44 |
| 5,798,907 | A * | 8/1998 | Janik | 361/683 |
| 6,078,014 | A | 6/2000 | Kashiwazaki et al. | |
| 6,166,338 | A * | 12/2000 | Ebato | 200/61.43 |
| 6,316,846 | B1 * | 11/2001 | Kashiwazaki et al. | 307/119 |
| 6,374,126 | B1 * | 4/2002 | MacDonald et al. | 455/569.1 |
| 6,504,379 | B1 * | 1/2003 | Jackson | 324/539 |
| 6,535,102 | B2 | 3/2003 | Marmaropoulos | |
| 6,563,424 | B1 * | 5/2003 | Kaario | 340/572.1 |
| 6,707,924 | B1 * | 3/2004 | Okiebisu | 381/385 |

(Continued)

FOREIGN PATENT DOCUMENTS

EP 0 293 735 12/1988

(Continued)

OTHER PUBLICATIONS

International Search Report for corresponding Application No. PCT/IB2006/001520 mailed Oct. 10, 2006.

*Primary Examiner*—William H. Mayo, III
(74) *Attorney, Agent, or Firm*—Renner, Otto, Boisselle & Sklar, LLP (57) ABSTRACT

A control cord for connecting an auxiliary device to a portable electronic device is provided. The control cord includes a flexible longitudinal housing and a plurality of electrical conductors extending from one end of the housing to which the auxiliary device will be connected, to an other end of the housing. In addition, the control cord includes a connector affixed to the other end of the housing and configured to connect the plurality of electrical conductors to the portable electronic device to enable operation of the portable electronic device in cooperation with the auxiliary device. The connector includes at least one terminal configured to be received by the portable electronic device, and the at least one terminal provides a control input to the portable electronic device, the control input being derived from physical manipulation of the housing.

25 Claims, 10 Drawing Sheets

U.S. PATENT DOCUMENTS

| | | |
|---|---|---|
| 6,747,227 B2 * | 6/2004 | Marmaropoulos et al. .. 200/550 |
| 6,753,756 B2 | 6/2004 | Marmaropoulos |
| 6,769,508 B1 * | 8/2004 | O'Connor ................. 181/129 |
| 2003/0133585 A1 * | 7/2003 | Cheung ..................... 381/382 |
| 2004/0037051 A1 * | 2/2004 | Hagiwara et al. .......... 361/749 |
| 2004/0198436 A1 | 10/2004 | Alden |
| 2005/0069147 A1 | 3/2005 | Pedersen |

FOREIGN PATENT DOCUMENTS

| | | |
|---|---|---|
| WO | 96/27891 | 9/1996 |
| WO | 2004/107887 A1 | 12/2004 |

* cited by examiner

CORD CONTROL AND ACCESSORIES HAVING CORD CONTROL FOR USE WITH PORTABLE ELECTRONIC DEVICES

TECHNICAL FIELD OF THE INVENTION

The present invention relates generally to portable electronic devices, and more particularly to cord control and accessories having cord control for use with portable electronic devices.

DESCRIPTION OF THE RELATED ART

Portable electronic devices have been popular for decades yet continue to increase in popularity. Many modern portable electronic devices are intended or suitable for recording or playback of acoustic and/or video signals. For example, portable CD or DVD players, MPEG players, MP-3 players, etc. provide a vast variety of forms of personal entertainment. Whether audio and/or video entertainment, there are numerous portable electronic devices to satisfy any user's tastes.

Similarly, portable electronic devices in the form of mobile phones, pagers, communicators, e.g., electronic organizers, personal digital assistants (PDAs), smartphones or the like are also becoming increasingly popular. Such devices allow a user to communicate with others, store and manipulate data, create text, etc., many times within the same device.

Depending on the particular application(s) a given portable electronic device performs, oftentimes one or more accessories are used in combination with the portable electronic device. Examples of such accessories include headsets, portable keyboards, input pens, scanners, etc. which may be coupled to the portable electronic device via an appropriate cord and connector. As a particular example, for many applications it is necessary to have a headset, the headset typically comprising one or more loudspeakers, which may be in the form of one or two earplugs, and/or one or more microphones. By using a headset, a user of a mobile phone can enjoy more privacy when the others around him or her cannot hear the telephone conversation. Further, by using a suitable microphone in the headset, the telephone call can still be successfully arrived at even though there may be much background noise.

Many accessories used with portable electronic devices make it desirable or even necessary to be able to control the portable electronic device via the accessory. For example, in the case of a headset it is desirable to be able to control the volume of the portable electronic device via the headset. This avoids a user having to reach into his or her pocket, purse, or whereever the portable electronic device may be held, in order to adjust the volume on the portable electronic device itself. For a portable music player or mobile phone which includes a music player, it is desirable for the user to be able to control such functions as volume, play, stop, skip, repeat, pause, etc. via the headset. For a mobile phone, it is desirable for the user to be able to answer or end a call via the headset so as to avoid the need to reach for the mobile phone in a pocket, purse, etc. With other types of accessories, it may be desirable to turn the portable electronic device on and off, or some other function(s), via the accessory itself.

There have been accessories in the past that allowed the user to control the personal electronic device via the accessory itself. For example, there have been headsets that included volume control. However, the volume control is typically in the form of buttons on the earpieces themselves, which leads to a more bulky enclosure and generally uncomfortable experience for the wearer. The more control buttons there are, the more bulky and uncomfortable the headsets become. Similarly, there have been headsets that have included volume control via a control switch located on the cord that connects the earpieces to the portable electronic device. However, the control switch typically is in the form of a small box-shaped enclosure that houses a sliding switch, press buttons, or the like. In such case, the cord of the accessory becomes more bulky and uncomfortable, causing extra weight and more of a pendulum effect as the wearer walks. Again, the more control buttons there are, the more bulky and uncomfortable the headsets become.

BRIEF SUMMARY OF THE INVENTION

In view of the aforementioned shortcomings, there is a strong need in the art for an accessory capable of controlling a personal electronic device without causing excessive bulk and/or discomfort for the user.

According to an aspect of the invention, a control cord for connecting an auxiliary device to a portable electronic device is provided. The control cord includes a flexible longitudinal housing and a plurality of electrical conductors extending from one end of the housing to which the auxiliary device will be connected, to an other end of the housing. In addition, the control cord includes a connector affixed to the other end of the housing and configured to connect the plurality of electrical conductors to the portable electronic device to enable operation of the portable electronic device in cooperation with the auxiliary device. The connector includes at least one terminal configured to be received by the portable electronic device, and the at least one terminal provides a control input to the portable electronic device, the control input being derived from physical manipulation of the housing.

According to an aspect, the control input is derived from a change in impedance resulting from physical manipulation of the housing.

According to another aspect, the control input is derived from a change in resistance.

According to yet another aspect, the control input is derived from a change in capacitance.

In accordance with yet another aspect, the housing includes an inner sheath surrounding the plurality of conductors, and an outer sheath surrounding and generally separated from the inner sheath, the control input being derived from a physical change in spacing between the inner sheath and the outer sheath.

In accordance with still another aspect, a surface of the inner sheath and a surface of the outer sheath facing one another are each at least partially electrically conductive.

According to another aspect, the control cord further includes a flexible spacer for providing the separation between the surfaces of the inner sheath and the outer sheath, the spacer having a tendency to yield as a result of the physical manipulation so as to allow the surfaces of the inner sheath and the outer sheath to contact each other.

According to still another aspect, at least one of the surfaces of the inner sheath and the outer sheath is at least partially electrically resistive.

According to yet another aspect, the surfaces of the inner sheath and the outer sheath are separated by a flexible dielectric material, the dielectric material having a tendency to yield as a result of the physical manipulation so as to allow the surfaces of the inner sheath and the outer sheath to vary in distance with respect to each other.

In accordance with a different aspect, the control cord further includes circuitry to detect the change in impedance and produces the control signal based thereon.

According to another aspect, the circuitry detects discrete changes in impedance.

According to another aspect, the circuitry detects continuous changes in impedance.

In accordance with yet another aspect, the control cord further includes an adaptor to adapt the control signal according to a predetermined criteria associated with a predefined portable electronic device.

In accordance with another aspect, a portable electronic device is provided. The portable electronic device includes functional circuitry for carrying out a predefined function, a device connector for receiving the connector of the control cord, and an adaptor for adapting the control signal provided by the control cord according to a predetermined criteria associated with the portable electronic device in or to control the operation of the portable electronic device.

According to an aspect, the control signal is operative to control at least one of play, pause, stop, volume, track selection, call answer, call send, and call end.

According to an aspect, the portable electronic device is a mobile phone.

According to another aspect, the portable electronic device is a music player.

According to still another aspect, a portable electronic accessory is provided. The portable electronic accessory includes a control cord and further includes an auxiliary device.

In accordance with another aspect, the auxiliary device is a personal hands-free device for a mobile phone.

In accordance with yet another aspect, the auxiliary device is a personal headphone.

According to another aspect, a method of controlling a portable electronic device operable with an auxiliary device is provided. The control cord connects the auxiliary device to the portable electronic device and includes a flexible longitudinal housing and a plurality of electrical conductors extending from one end of the housing to which the auxiliary device is connected, to an other end of the housing. The control cord further includes a connector affixed to the other end of the housing and configured to connect the plurality of electrical conductors to the portable electronic device to enable operation of the portable electronic device in cooperation with the auxiliary device. The connector includes at least one terminal configured to be received by the portable electronic device, the at least one terminal providing a control input to the portable electronic device, the control input being derived from physical manipulation of the housing. The method includes the steps of physically manipulating the housing; and effecting a change in the operation of the portable electronic device as a result of the step of physically manipulating the housing.

According to another aspect, the step of physically manipulating the housing includes compressing the housing.

In accordance with another aspect, the step of physically manipulating the housing includes bending the housing.

In accordance with yet another aspect, the step of physically manipulating the housing includes physically manipulating the housing in a continuous manner along at least a portion of a length of the control cord.

According to another aspect, the step of physically manipulating effects a change in volume of the portable electronic device.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

The present invention will now be described with reference to the figures, in which like reference labels are used to refer to like elements throughout.

Figure 1:
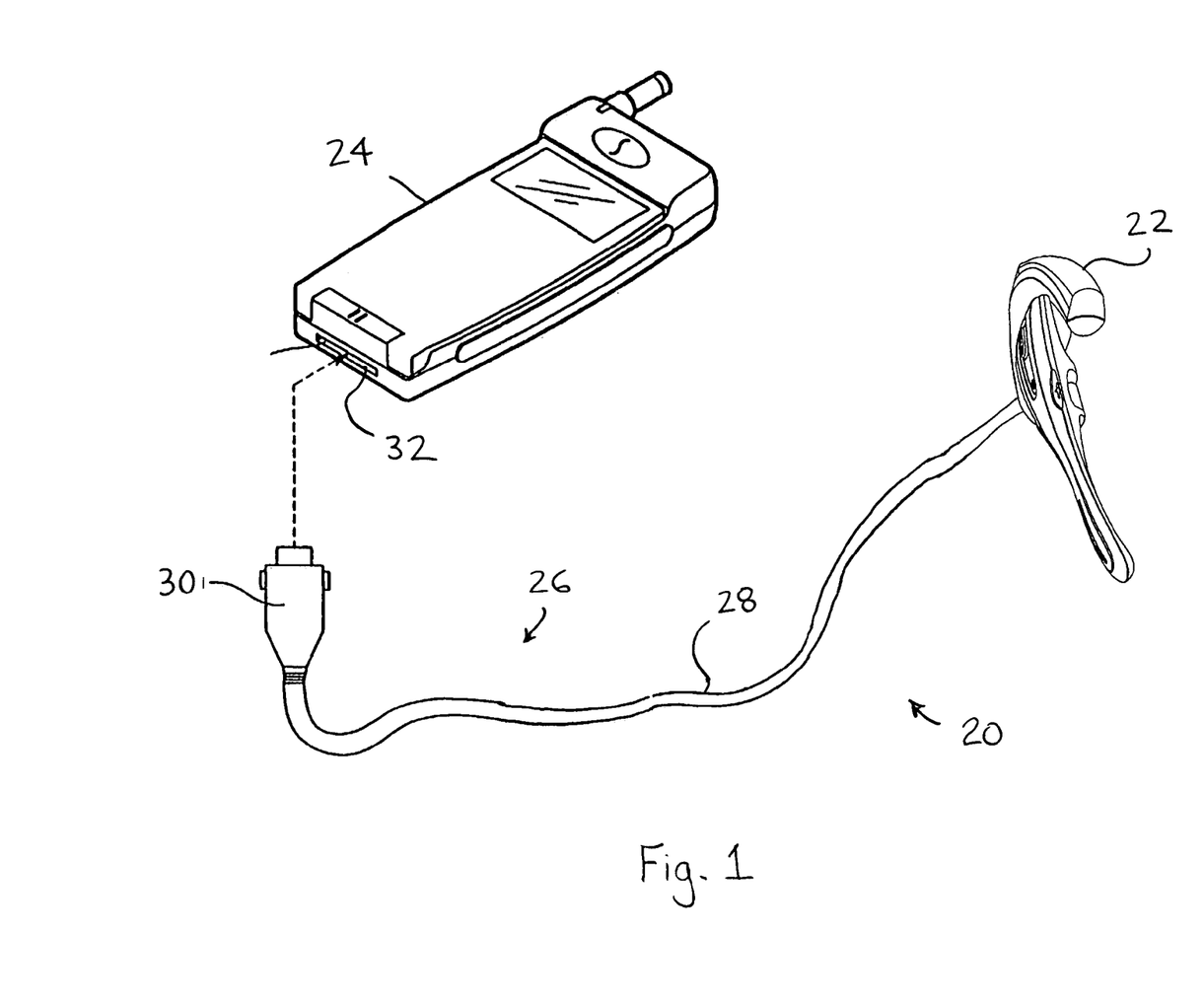
FIG. 1 is a schematic perspective view of an auxiliary device having cord control as used with a portable electronic device in accordance with an example of the present invention.

FIG. 1 illustrates an exemplary embodiment of an accessory 20 in accordance with the present invention. In this particular example, the accessory 20 includes an auxiliary device in the form of a headset 22, which connects to a portable electronic device, such as a mobile phone 24, by way of a control cord 26. As is conventional, the headset 22 allows a user of the mobile phone 24 to experience personal hands-free (PHF) communications with someone at the other end of a call.

The control cord 26 of the present invention includes a flexible longitudinal housing 28 that includes one or more electrically conductive wires which connect the headset 22 to the mobile phone 24. Specifically, the headset 22 is connected at one end of the housing 28 and a connector 30 is connected at the other end. The connector 30 is configured to be removeably connectable to the mobile phone 24 via a corresponding connector 32 included within the mobile phone 24. This allows the user to attach the PHF accessory 20 to the mobile phone whenever desired, as is known.

In one embodiment, the headset 22 is fixedly attached to the end of the control cord 26 via an appropriate connector (not shown) so as to remain fixedly a part of the control cord 26. According to another embodiment, the headset 22 is removeably connected to the control cord 26 such that the same control cord 26 can be used with a variety of different auxiliary devices including the headset 22.

As will be appreciated in view of the following description, the control cord 26 of the present invention allows the user to control the operation of the mobile phone 24 (or other portable electronic device) simply by physical manipulation of the control cord 26. More specifically, the user may control the mobile phone 24 simply by squeezing, pinching, bending, etc., the flexible longitudinal housing 28. As a result of such physical manipulation, changes in one or more characteristics of the control cord 26, such as the resistance or capacitance, may be detected in order to control the mobile phone 24. The physical manipulation of the housing 28 enables various different types of control to be provided without the need for control buttons or switches on the headset 22 or control cord 26 themselves. This avoids the headset or cord becoming overly bulky and uncomfortable for the user.

The present invention is described herein primarily in the context of an accessory and cord control for a mobile phone 24. However, those having ordinary skill in the art will appreciate that the present invention has application to a variety of types of accessories and portable electronic devices. The present invention is intended to encompass any and all types of accessories and portable electronic devices without necessarily being limited to mobile phones.

The term "portable electronic device" as referred to herein includes portable radio communication equipment. The term "portable radio communication device", also referred to herein as a "mobile radio terminal", includes all equipment such as mobile phones, pagers, communicators, e.g., electronic organizers, personal digital assistants (PDAs), smartphones or the like.

Figure 2:
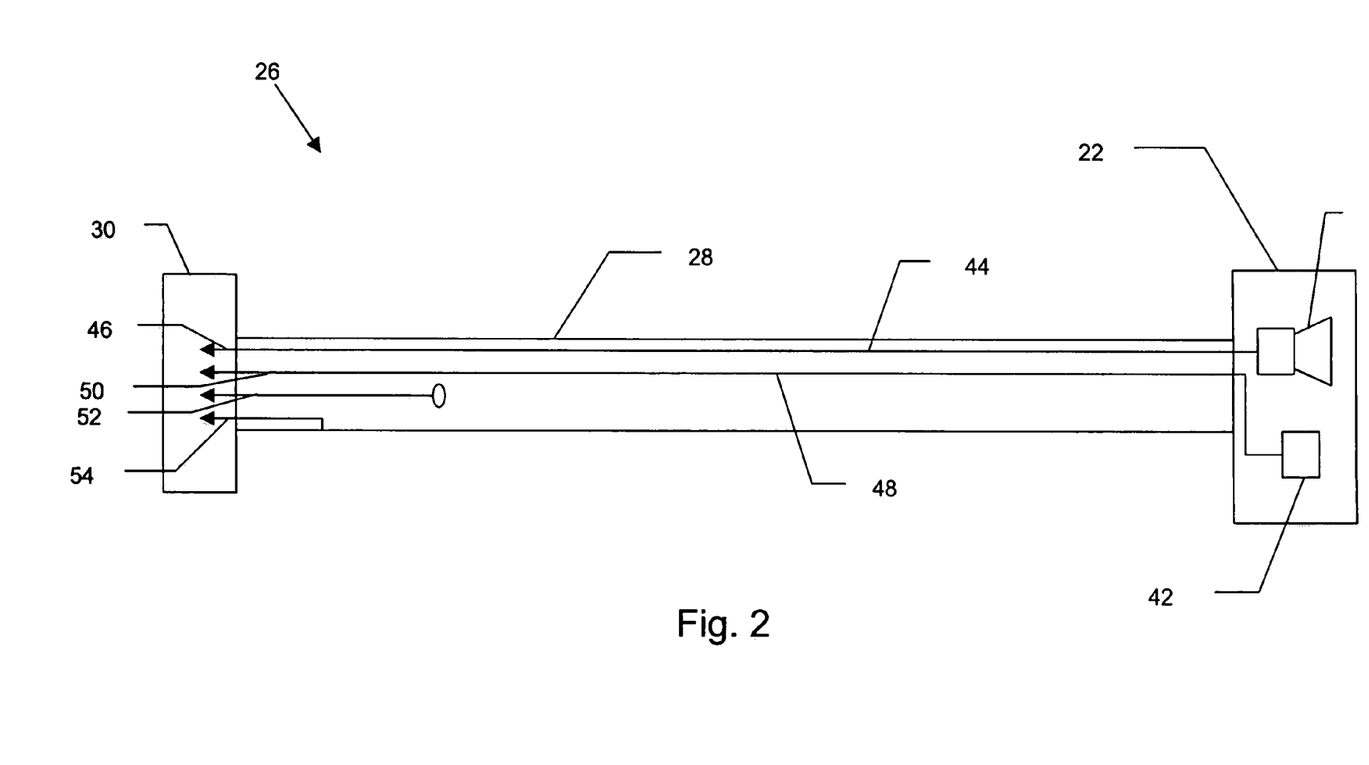
FIG. 2 is a schematic block diagram of an auxiliary device with having cord control in accordance with an example of the present invention.

Referring now to FIG. 2, the control cord 26 and headset 22 are illustrated in detail. The headset 22 includes a speaker 40 and microphone 42. The speaker 40 is designed for placement near the ear of the user and the microphone 42 near the mouth (e.g., via a boom), as is conventional. One or more electrically conductive wires 44 are included within the longitudinal housing 28 of the control cord 26 and connect the speaker 40 to corresponding terminals 46 in the connector 30. As will be appreciated, the wires 44 serve to conduct audio signals from the mobile phone 24 to the speaker 40 to allow the user to hear the party on the other end of the call in a personal, hands-free manner. Similarly, one or more electrically conductive wires 48 are included with the longitudinal housing 28 and connect the microphone 42 to corresponding terminals 50 in the connector 30. As again will be appreciated, the wires 48 serve to conduct audio signals from the microphone 42 to the mobile phone 24 to allow the user to speak to the party on the other end of the call in a personal, hands-free manner.

In the example of the present invention shown in FIG. 2, the control cord 26 further includes a pair of terminals 52 and 54 within the connector 30. As will be explained in more detail below, the terminals 52 and 54 are electrically connected within the control cord 26 to provide a control input to the mobile phone 24 that is derived from physical manipulation of the housing 28. This control input may be represented by a change of impedance (e.g., resistance and/or capacitance) across the terminals 52 and 54. Alternatively, the control input can be represented by discrete voltages, digital codes, etc., which are output at the terminals 52 and 54. Either way, the physical manipulation of the housing 28, e.g., squeezing, pinching, bending, etc., results in a control input provided to the mobile phone 24. This control input may serve to raise or lower the volume of the headset 22, pick up or end a call, etc. So long as the control cord 26 is configured to provide the control input to the mobile phone 24 in a predefined manner understood by the mobile phone 24, the user may use the control cord 26 to control virtually any function simply by physically manipulating the housing 28. There is no need for extra control buttons on the headset 22 or control boxes housing switches or control buttons provided in addition to the flexible longitudinal housing 28.

Figure 3:
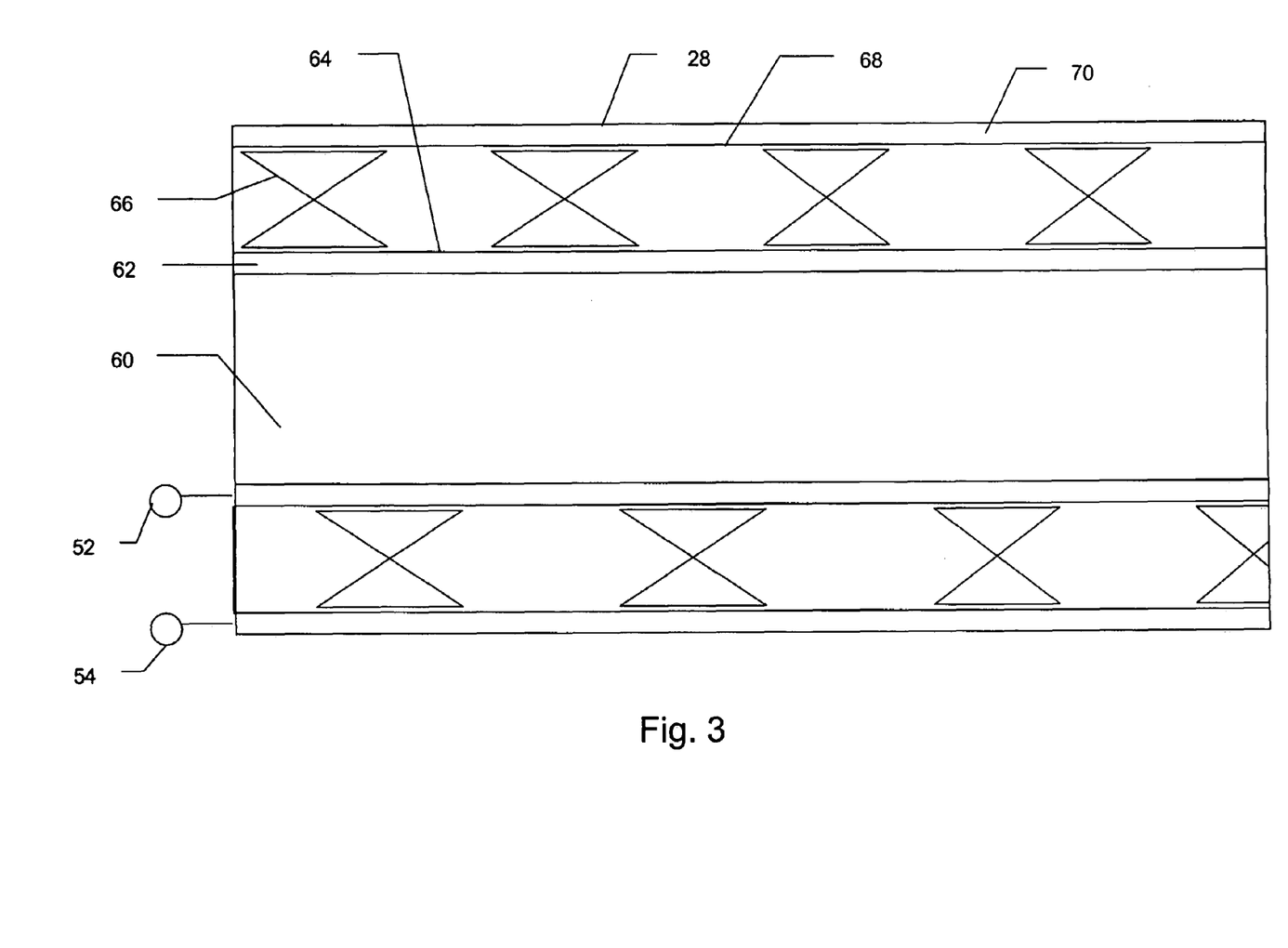
FIG. 3 is a schematic longitudinal cross section of a control cord, in relevant part, in accordance with an embodiment of the present invention.
Figure 4:
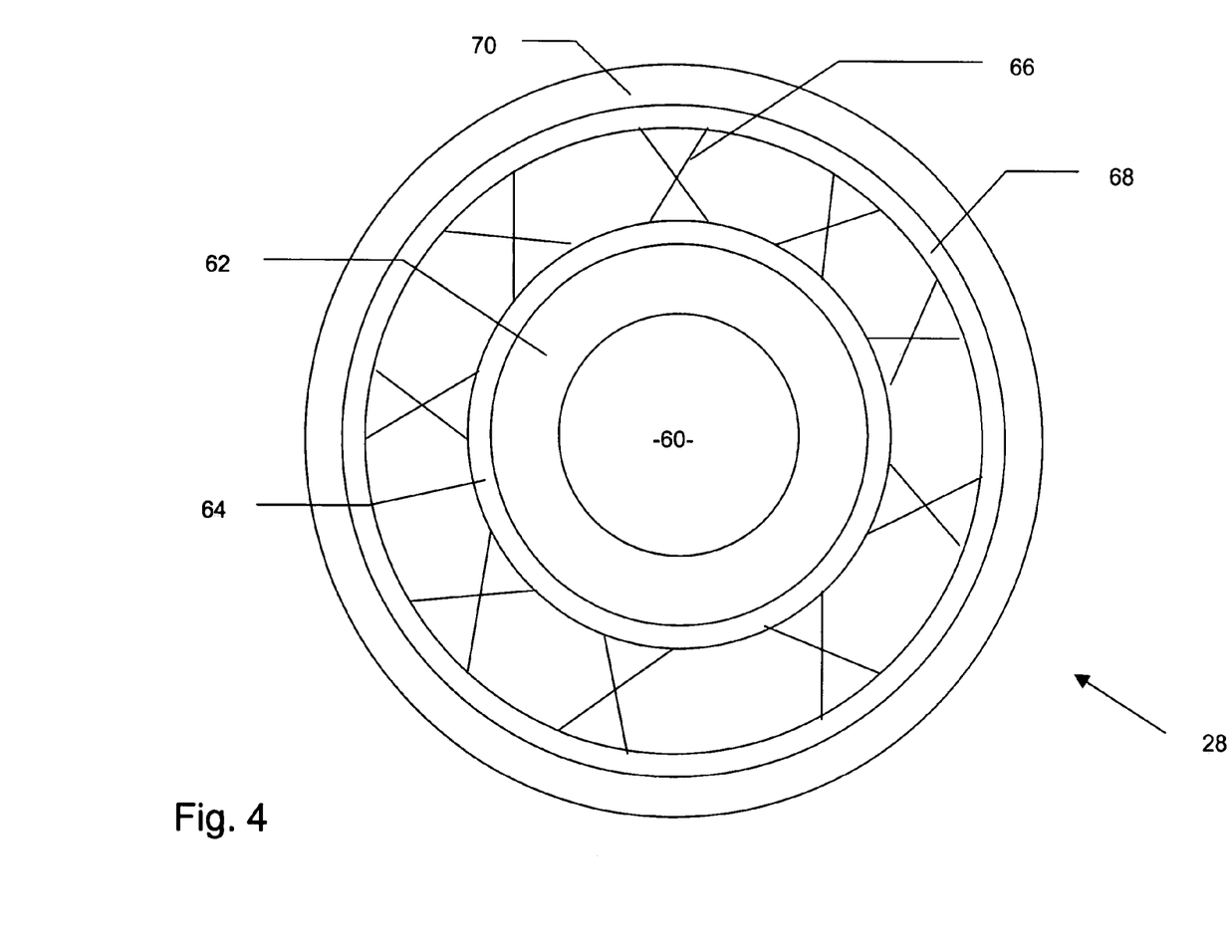
FIG. 4 is a schematic end cross section of the control cord of FIG. 3 in accordance with an embodiment of the present invention.

FIGS. 3 and 4 respectively represent a side and end cross-section of the longitudinal housing 28, in relevant part, according to one particular embodiment of the present invention. The housing 28 includes a generally hollow core 60 through which the electrically conductive wires 44 and 48 (not shown in FIGS. 3 and 4) extend between the connector 30 and the headset 22. The hollow core 60 is formed by a generally cylindrical inner sheath 62. The inner sheath 62 is preferably made of a flexible material such as generally soft rubber or plastic of the type typically used as an insulative/protective covering for the cord connecting a headset to a portable electronic device. By flexible, it is meant herein that the material is generally susceptible to resilient bending or flexing along the longitudinal axis of the housing 28 and/or radially with respect to the longitudinal axis of the housing 28.

An electrically conductive layer 64 is provided on the outer surface of the inner sheath 62 as best illustrated in FIG. 4. Preferably the conductive layer 64 is provided along the majority of the length of the housing 28, but at least is provided along the relevant portion of the housing 28 at which physical manipulation of the housing is intended to provide control. The conductive layer 64 is connected to terminal 52 in the connector 30, either directly or indirectly based on the particular embodiment of the invention as will be appreciated herein. The conductive layer 64 preferably is made of a thin sheet of copper or other conductive material laminated to the surface of the inner sheath 62. Alternatively, the conductive layer 64 may be made of an electrically conductive material that is deposited on the surface of the inner sheath 62 using known deposition techniques. The particular manner in which the conductive layer 64 is formed on the surface of the inner sheath 62 is not germane to the invention in its broadest sense, and any and all methods are contemplated herein.

Surrounding the conductive layer 62 is a spacer layer 66. Surrounding the spacer layer 66 is a conductive layer 68 formed on an inner surface of an outer sheath 70 included in the housing 28. The spacer layer 66 is itself flexible and generally serves to separate the conductive layer 64 on the outer surface of the inner sheath 62 from the conductive layer 68 formed on an inner surface of a generally cylindrical outer sheath 70. In the exemplary embodiment, the spacer layer 66 may be made of a non-conductive mesh sleeve. For example, the spacer layer 66 may be made of a woven fabric such as nylon or the like. The thickness and density of the fiber(s) making up the woven fabric are selected such that in a normal state (i.e., absent physical manipulation of the housing 28 by the user), the spacer layer 66 maintains a separation between the conductive layers 64 and 68. On the other hand, if the housing 28 is pinched, squeezed or bent, for example by the fingers of a user, the spacer layer 66 yields radially such that the conductive layers 64 and 68 contact one another at the location of the pinch, squeeze, bend, etc.

Figure 5:
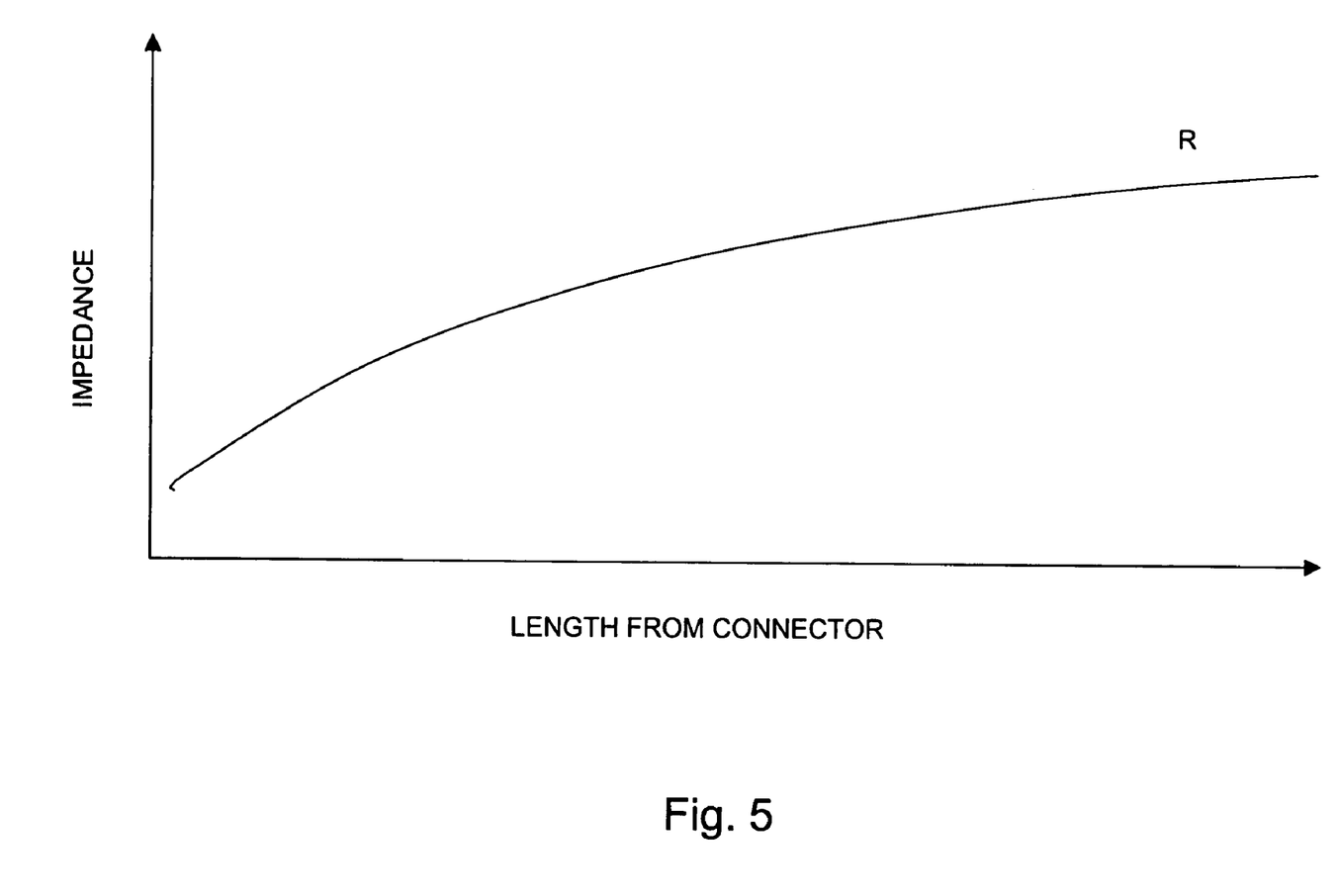
FIG. 5 is a graph that exemplifies a change in impedance of the control cord based on a location at which the cord is physically manipulated along a length of the cord in accordance with an embodiment of the present invention.

The conductive layer 68, similar to the conductive layer 64, is connected either directly or indirectly to the terminal 54 in the connector 30. According to an embodiment of the invention, one or both of the conductive layers 64 and 68 includes a resistive component. As a result, in the case where the terminals 52 and 54 are directly connected to the conductive layers, the resistance presented across the terminals 52 and 54 will vary as a function of where along the length of the housing 28 the conductive layers 64 and 68 contact one another as a result of the pinch, squeeze, bend, etc. For example, FIG. 5 illustrates how the resistance R across the terminals 52 and 54 will tend to increase the further from the connector 30 the conductive layers 64 and 68 contact one another as a result of the pinch, squeeze, bend, etc.

The mobile phone 24, by detecting the change in resistance as a result of the physical manipulation, can be configured to increase volume, decrease volume, etc. For example, the resistance R across the terminals 52 and 54 may be divided into a number of discrete bands along the length of the longitudinal housing 28. By way of the user pinching, bending or squeezing the housing 28 so as to cause contact between the conductive layers 64 and 68, a resultant resistance is presented across the terminals 52 and 54. The mobile phone 24 may be configured to determine which band the resistance falls within, and adjusts the volume to the headset 22 to a corresponding level. In this manner, the cord control may be used to provide volume control for a discrete number of levels (e.g., eleven).

Alternatively, the housing 28 may be physically manipulated in what may be referred to as a continuous manner. For example, a user may pinch, squeeze or bend the housing 28 at a particular location using his or her fingers. While maintaining the pinch, squeeze or bend, the user may slide his or her fingers up or down so as to change the particular location of the pinch, squeeze or bend along the length of the housing. Depending on whether the user slides his or her fingers towards the connector 30 or away, the resistance across the terminals 52 and 54 will decrease or increase with respect to time during such sliding. The mobile phone 24 may be configured to detect such continuous decrease or increase in resistance and adjust the volume level proportionally. It will be apparent, based on the disclosure herein, that an entire variety of controls can be provided utilizing the basic principles of the invention.

Similar to the inner sheath 62, the outer sheath 70 preferably is made of a flexible material such as generally soft rubber or plastic of the type typically used as an insulative/protective covering for the cord connecting a headset to a portable electronic device. Also, the conductive layer 68 preferably is provided along the majority of the length of the housing 28, but at least is provided along the relevant portion of the housing 28 at which physical manipulation of the housing is intended to provide control. The conductive layer 68 preferably is made of a thin sheet of copper or other conductive material laminated to the surface of the inner sheath 62. Alternatively, the conductive layer 68 may be made of an electrically conductive material that is deposited on the inner surface of the outer sheath 70 using known deposition techniques. The particular manner in which the conductive layer 68 is formed also is not germane to the invention in its broadest sense, and any and all methods are contemplated herein.

Figure 6:
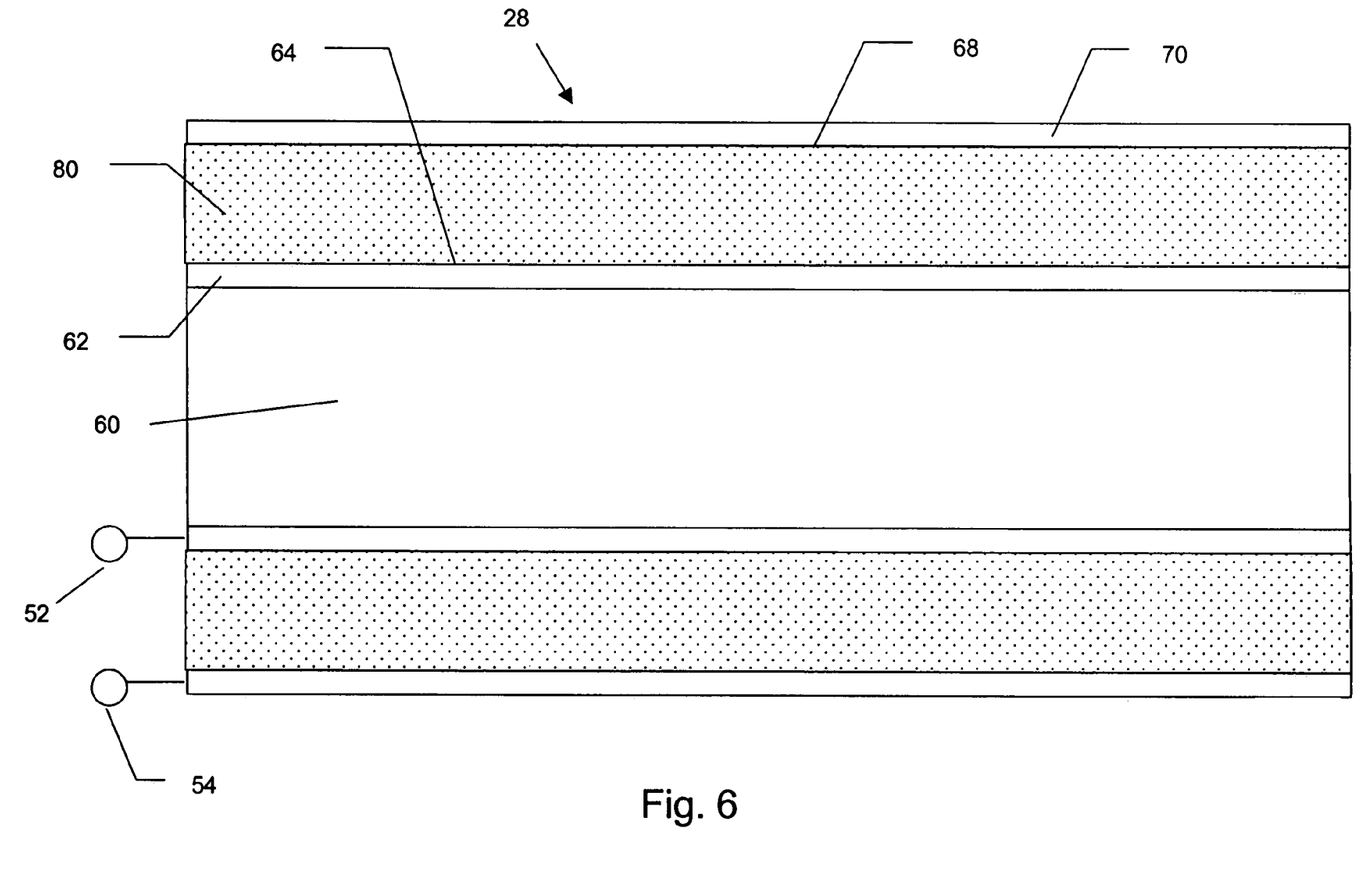
FIG. 6 is a schematic longitudinal cross section of a control cord, in relevant part, in accordance with another embodiment of the present invention.

FIG. 6 illustrates an embodiment of the invention that utilizes capacitive principles rather than resistive principles as in the embodiment of FIGS. 3 and 4. The configuration of the embodiment of FIG. 6 is generally the same as that of the embodiment of FIGS. 3 and 4, as represented by like reference numerals. Accordingly, only the primary differences are discussed herein for sake of brevity. Specifically, the spacer layer 66 in the embodiment of FIGS. 3 and 4 is replaced by a flexible dielectric layer 80 as is shown in FIG. 6. The dielectric layer 80 separates the conductive layers 64 and 68, thereby presenting a capacitance value across the terminals 52 and 54 in the case where the conductive layers 64 and 68 are directly connected to the terminals. Under normal conditions (i.e., without physical manipulation of the housing 28), the terminals 52 and 54 will have some given capacitance there across. Upon a user pinching, squeezing or bending the housing 28, the flexible dielectric layer 80 will tend to yield radially at the location of the pinching, squeezing, or bending. This results in the spacing between the conductive layers 64 and 68 distorting and generally becoming reduced at the location of the pinching, squeezing, bending, etc. Consequently, the capacitance presented across the terminals 52 and 54 will vary in accordance with the location and/or degree of the physical manipulation.

The particular capacitive characteristics of the housing 28 can be determined theoretically or empirically, and similar to the resistive embodiment, the changes in the capacitance across the terminals 52 and 54 may serve to control the mobile phone 24. In yet another embodiment, one or more of the conductive layers 64 and 68 may include a resistive component similar to the embodiment of FIGS. 3 and 4. In this case, the terminals 52 and 54 will exhibit a complex impedance which can serve to control the mobile phone 24 in similar manner.

Figure 7:
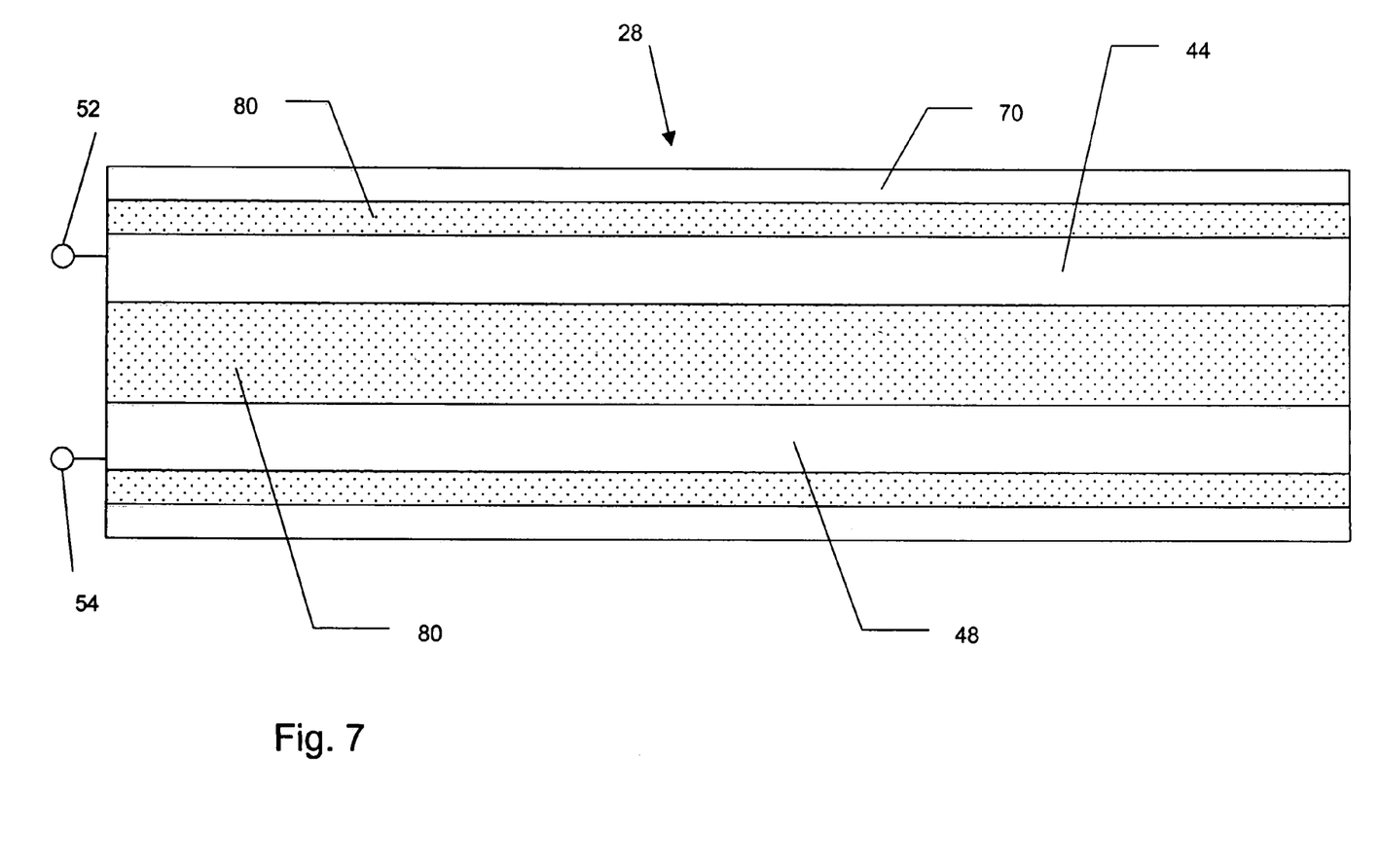
FIG. 7 is a schematic longitudinal cross section of a control cord, in relevant part, in accordance with still another embodiment of the present invention.
Figure 8:
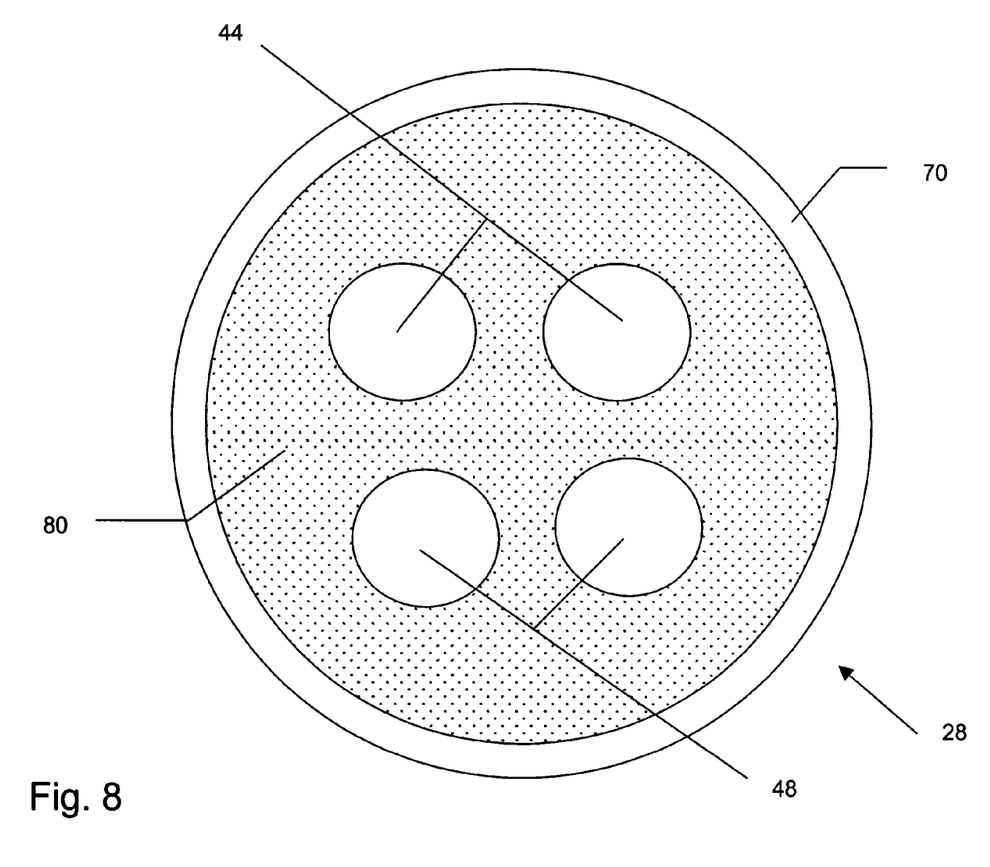
FIG. 8 is a schematic end cross section of the control cord of FIG. 7 in accordance with the embodiment of the present invention.

The embodiments of FIGS. 3-4 and 6 each rely on changes in characteristics of the housing 28 independent of the wires 44 and 48 that provide the audio signals between the headset 22 and the mobile phone 24. In the embodiment of FIGS. 7 and 8, on the other hand, the very same wires 44 and 48 may be utilized. For example, FIG. 8 illustrates how the housing 28 may include a pair of wires 44 and a pair of wires 48 for providing audio signals to/from the speaker 40 and microphone 42, respectively. The wires 44 and 48 are within an outer sheath 70 and are generally surrounded by a flexible dielectric material 80. The terminals 52 and 54 are connected to the wires 44 and 48, for example in a bridge arrangement. When the housing 28 is physically manipulated, the spacing between the wires 44 and 48 will become distorted, thereby changing the capacitance across the terminals 52 and 54 compared to the normal state where the housing 28 is not physically manipulated. Again, this change in characteristics of the housing 28 may be used to control the mobile phone 24.

Particularly in the embodiment of FIGS. 7 and 8, preferably sufficient isolation is provided at the terminals 52 and 54 so as to avoid loading down the audio signals on the wires 44 and 48, as will be appreciated.

Figure 9:
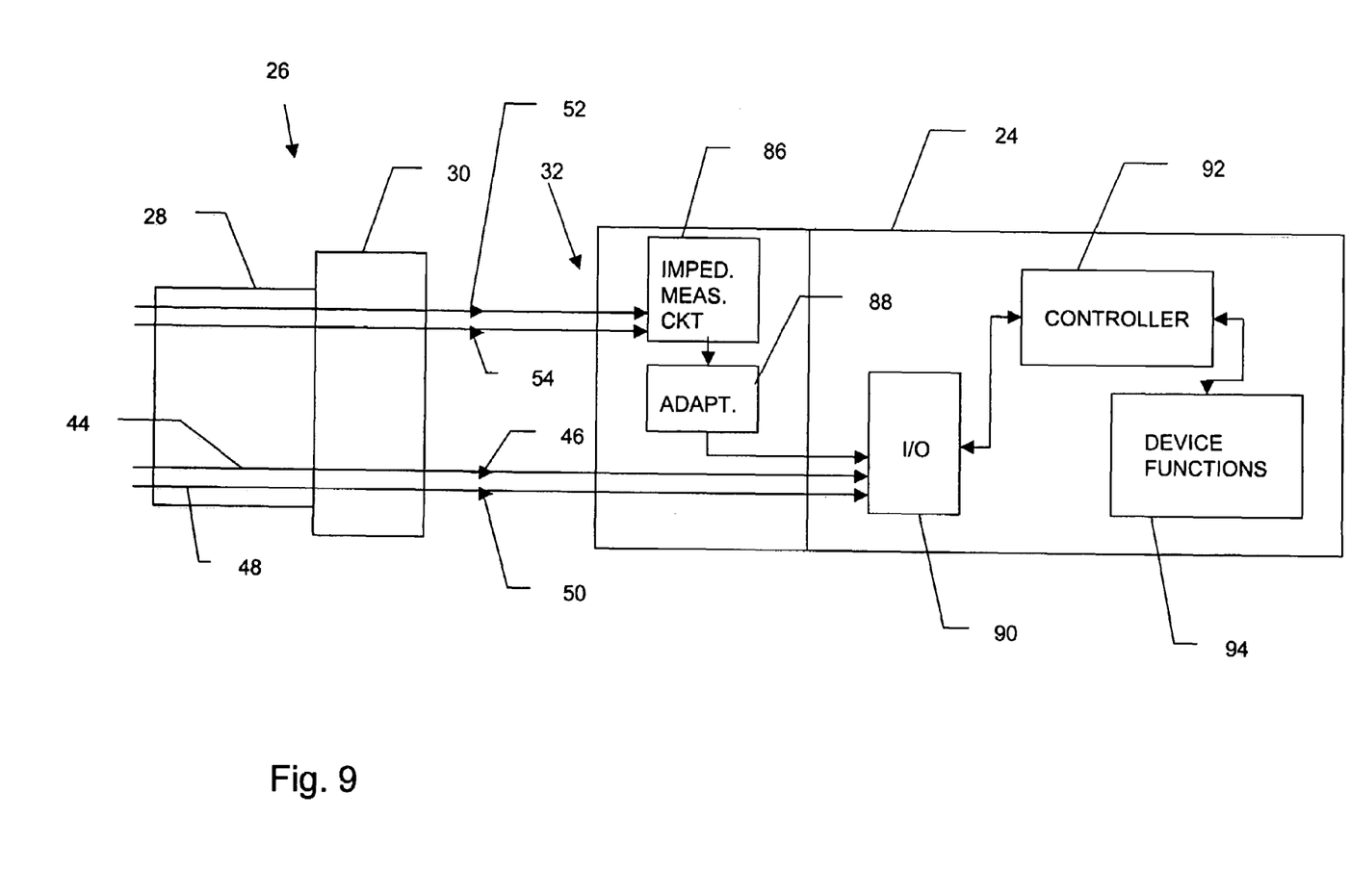
FIG. 9 is a schematic block diagram of a control cord and portable electronic device in accordance with an embodiment of the present invention.

FIG. 9 is a functional block diagram of the control cord 26 and mobile phone 24 according to a particular embodiment of the present invention. In this embodiment, the conductive layers 64 and 68 are connected directly to terminals 52 and 54, respectively, so as to provide a control signal in the form of a direct impedance value. The terminals 52 and 54 are connected to the mobile phone 24 via the connector 32. Included within the mobile phone 24 is an impedance measuring circuit 86 which detects the impedance (e.g., resistance or capacitance) presented across terminals 52 and 54. The impedance measuring circuit 86 outputs the measured impedance value to an adaptor 88 which adapts the impedance (or change therein) to discrete voltage(s), resistance(s), digital command(s), etc., which are in a form that the mobile phone 24 is accustomed to receiving control signals from an auxiliary device. The output of the adaptor 88 is provided to an input/output (I/O) interface 90 and controller 92 within the mobile phone 24. Based on the output of the adaptor 88, the controller 92 controls the functions 94 (e.g., transmitting/receiving calls, controlling a phone list, etc.) of the mobile phone 24 in conventional manner.

The embodiment of FIG. 9 presupposes that the mobile phone 24 is not configured already to receive an impedance based control signal across the terminals 52 and 54 directly into the I/O interface 90. Thus, the impedance measuring circuit 86 and adaptor 88 are provided. The impedance measuring circuit 86 and adaptor 88 may be included within the mobile phone 24 as shown, by adding such circuitry to conventional or existing mobile phone designs. Alternatively, the impedance measuring circuit 86 and adaptor 88 may be configured and sold as a separate add-on device that connects on one end to a conventional mobile phone 24, and connects on the other end to the control cord 26 via the connector 30.

Figure 10:
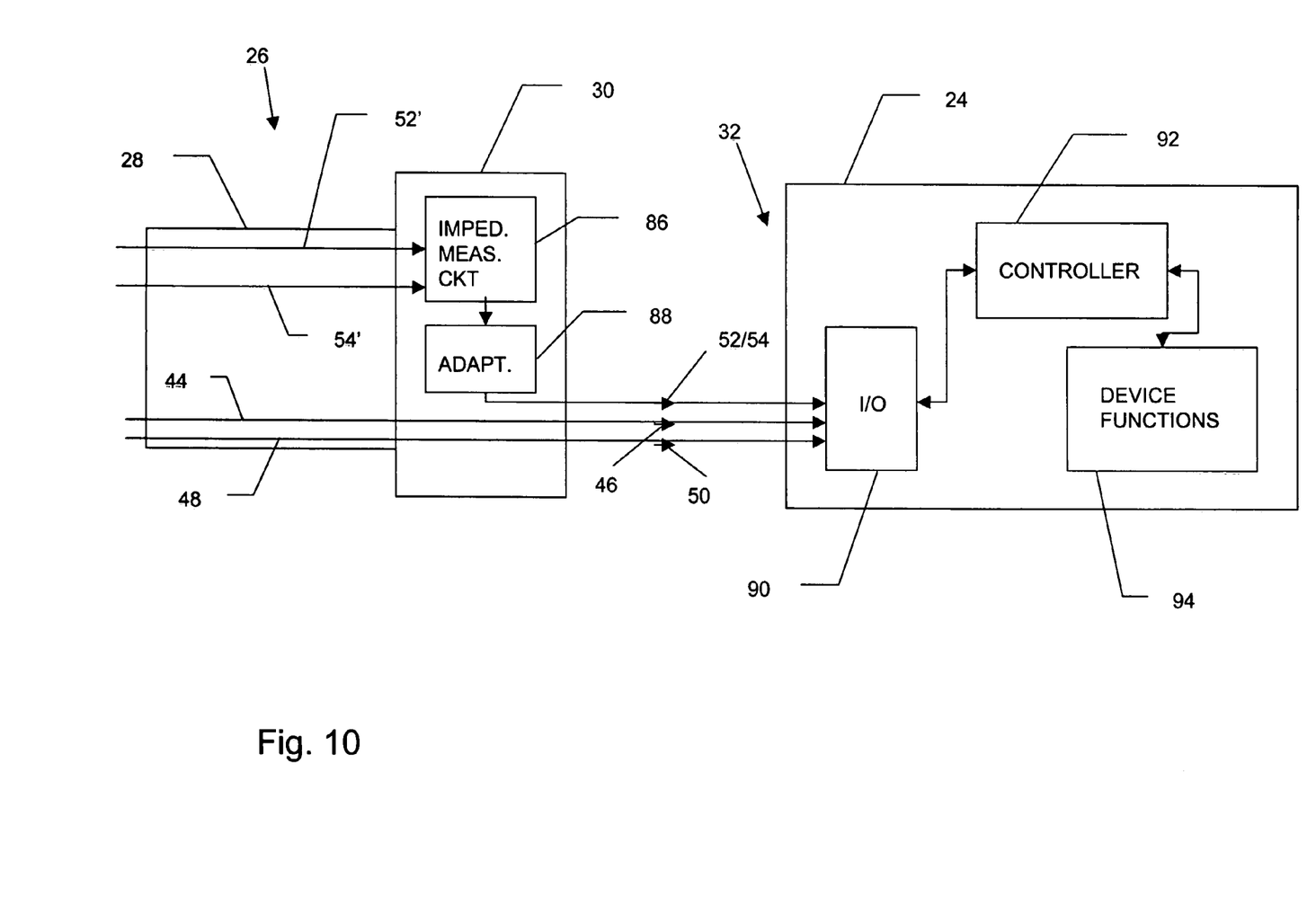
FIG. 10 is a schematic block diagram of a control cord and portable electronic device in accordance with another embodiment of the present invention.

As yet another alternative, FIG. 10 illustrates an embodiment in which the connector 30 of the control cord 26 includes the impedance measuring circuit 86 and adaptor 88. Power for the circuits can be provided by a battery within the connector 30 (not shown), or by the mobile telephone 24 itself via the I/O interface 90. The conductive layers 64 and 68 from the longitudinal housing 28 are directly input to the impedance measuring circuit 86 via connections 52' and 54', respectively. The impedance measuring circuit 86 measures the impedance, or change thereof, and provides its output to the adaptor 88 similar to the embodiment in FIG. 9. The adaptor 88 outputs the appropriate control signal via terminals 52/54 via the connector 30 to the mobile phone 24.

It will be appreciated that the embodiment of FIG. 10 allows the control cord 26 to be configured and sold as a device specific accessory. In other words, the user or owner of a conventional mobile phone 24 may buy a control cord 26 designed to provide the appropriate control signals to the mobile phone 24 without the need for a separate, add-on adaptor.

Again, the present invention provides a manner for controlling a portable electronic device based simply on the physical manipulation of the control cord that connects an auxiliary device to the portable electronic device. The portable electronic device can be a mobile phone, CD player, MP-3 player, video player, etc. The particular functions that are controlled can be virtually any function for which it is preferable to control or adjust via the cord rather than having to reach inconveniently into a pocket, purse, etc. and/or be exposed to bulky and uncomfortable controls. Such functions may include volume, track selection, skip, call answer, call send, call end, etc.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

The invention claimed is:

1. A control cord for connecting an auxiliary device to a portable electronic device, comprising:
 a flexible longitudinal housing;
 a plurality of electrical conductors extending from one end of the housing to which the auxiliary device will be connected, to an other end of the housing;
 a connector affixed to the other end of the housing and configured to connect the plurality of electrical conductors to the portable electronic device to enable operation of the portable electronic device in cooperation with the auxiliary device; and
 the connector including at least one terminal configured to be received by the portable electronic device, the at least one terminal for providing a control input to the portable electronic device, the control input being derived from physical manipulation of the housing.

2. The control cord of claim 1, wherein the control input is derived from a change in impedance resulting from physical manipulation of the housing.

3. The control cord of claim 2, wherein the control input is derived from a change in resistance.

4. The control cord of claim 2, wherein the control input is derived from a change in capacitance.

5. The control cord of claim 2, further comprising circuitry to detect the change in impedance and produces the control signal based thereon.

6. The control cord of claim 5, wherein the circuitry detects discrete changes in impedance.

7. The control cord of claim 5, wherein the circuitry detects continuous changes in impedance.

8. The control cord of claim 5, further comprising an adaptor to adapt the control signal according to a predetermined criteria associated with a predefined portable electronic device.

9. The control cord of claim 1, wherein the housing comprises an inner sheath surrounding the plurality of conductors, and an outer sheath surrounding and generally separated from the inner sheath, the control input being derived from a physical change in spacing between the inner sheath and the outer sheath.

10. The control cord of claim 9, wherein a surface of the inner sheath and a surface of the outer sheath facing one another are each at least partially electrically conductive.

11. The control cord of claim 10, further comprising a flexible spacer for providing the separation between the surfaces of the inner sheath and the outer sheath, the spacer having a tendency to yield as a result of the physical manipulation so as to allow the surfaces of the inner sheath and the outer sheath to contact each other.

12. The control cord of claim 11, wherein at least one of the surfaces of the inner sheath and the outer sheath is at least partially electrically resistive.

13. The control cord of claim 10, wherein the surfaces of the inner sheath and the outer sheath are separated by a flexible dielectric material, the dielectric material having a tendency to yield as a result of the physical manipulation so as to allow the surfaces of the inner sheath and the outer sheath to vary in distance with respect to each other.

14. A portable electronic device, comprising functional circuitry for carrying out a predefined function, a device connector for receiving the connector of the control cord of claim 1, and an adaptor for adapting the control signal provided by the control cord according to a predetermined criteria associated with the portable electronic device in or to control the operation of the portable electronic device.

15. The portable electronic device of claim 14, wherein the control signal is operative to control at least one of play, pause, stop, volume, track selection, call answer, call send, and call end.

16. The portable electronic device of claim 14, wherein the portable electronic device is a mobile phone.

17. The portable electronic device of claim 14, wherein the portable electronic device is a music player.

18. A portable electronic accessory, comprising the control cord of claim 1 and further comprising the auxiliary device.

19. The portable electronic accessory of claim 18, wherein the auxiliary device is a personal hands-free device for a mobile phone.

20. The portable electronic accessory of claim 18, wherein the auxiliary device is a personal headphone.

21. A method of controlling a portable electronic device operable with an auxiliary device, the control cord connecting the auxiliary device to the portable electronic device and comprising a flexible longitudinal housing; a plurality of electrical conductors extending from one end of the housing to which the auxiliary device is connected, to an other end of the housing; a connector affixed to the other end of the housing and configured to connect the plurality of electrical conductors to the portable electronic device to enable operation of the portable electronic device in cooperation with the auxiliary device; and the connector including at least one terminal configured to be received by the portable electronic device, the at least one terminal providing a control input to the portable electronic device, the control input being derived from physical manipulation of the housing, the method comprising the steps of:

physically manipulating the housing; and effecting a change in the operation of the portable electronic device as a result of the step of physically manipulating the housing.

22. The method of claim 21, wherein the step of physically manipulating the housing comprises compressing the housing.

23. The method of claim 21, wherein the step of physically manipulating the housing comprises bending the housing.

24. The method of claim 21, wherein the step of physically manipulating the housing comprises physically manipulating the housing in a continuous manner along at least a portion of a length of the control cord.

25. The method of claim 24, wherein the step of physically manipulating effects a change in volume of the portable electronic device.

* * * * *